US006737139B2

(12) United States Patent
Sidney et al.

(10) Patent No.: US 6,737,139 B2
(45) **Date of Patent: *May 18, 2004**

(54) CONTINUOUS SUPPLY EDGE-TO-EDGE LAMINATE FOR PLASTIC CARDS AND METHOD OF FABRICATION

(75) Inventors: LuAnn N. Sidney, Chanhassen, MN (US); Gary B. Fulmer, Eden Prairie, MN (US)

(73) Assignee: Fargo Electronics, Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,008

(22) Filed: Oct. 29, 1999

(65) Prior Publication Data

US 2002/0150713 A1 Oct. 17, 2002

(51) Int. Cl.[7] ........ B32B 3/00

(52) U.S. Cl. ........ 428/43; 40/299.01; 283/81; 283/86; 283/109; 428/200; 428/201; 428/203; 428/914

(58) Field of Search ........ 428/43, 914, 200, 428/201, 203; 283/81, 86, 109; 40/299

(56) References Cited

U.S. PATENT DOCUMENTS

| | | | | |
|---|---|---|---|---|
| 4,971,646 A | * | 11/1990 | Schell | 283/109 |
| 5,058,926 A | * | 10/1991 | Drower | 283/109 |
| 5,805,193 A | | 9/1998 | Follett et al. | 347/171 |

* cited by examiner

*Primary Examiner*—Nasser Ahmad
(74) *Attorney, Agent, or Firm*—Westman, Champlin & Kelly

(57) ABSTRACT

A laminate of transparent flexible material is formed to the precise size of a substrate and is made so that it will be laminated in place on the substrate. The laminate is in an elongated web that is separated into individual laminate sections by transverse lines of reduced tear strength so that the laminate sections can be removed from the web sequentially.

10 Claims, 2 Drawing Sheets

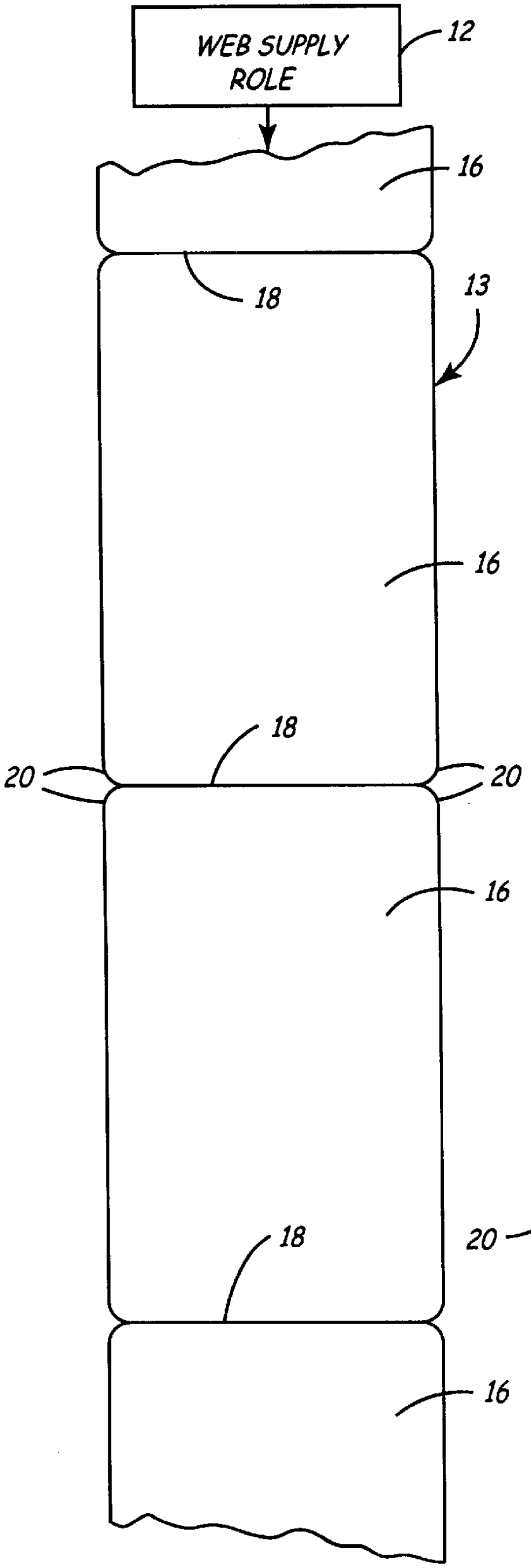
FIG. 1
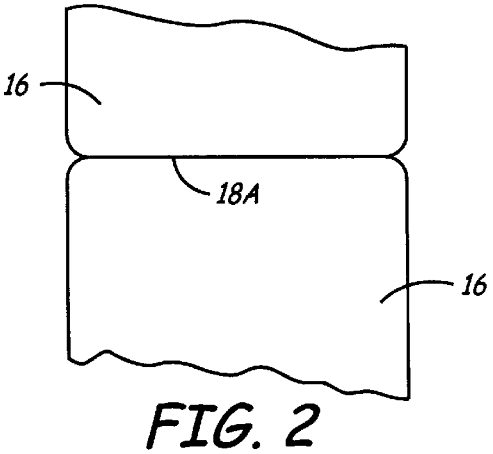
FIG. 2
FIG. 3
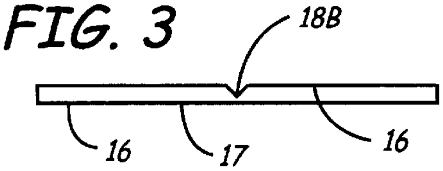
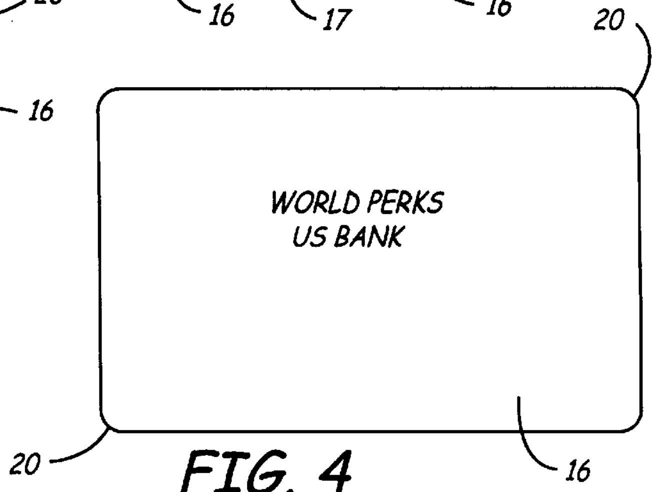
FIG. 4
FIG. 5

CONTINUOUS SUPPLY EDGE-TO-EDGE LAMINATE FOR PLASTIC CARDS AND METHOD OF FABRICATION

CROSS REFERENCE TO RELATED APPLICATION

Reference is made to U.S. patent application Ser. No. 09/430,566, filed on Oct. 29, 1999, and entitled "WASTE-LESS LAMINATOR" and assigned to the same assignee as this application. The above-identified application is incorporated herein by reference herein in its entirety.

BACKGROUND OF THE INVENTION

This invention relates to a web or continuous strip of clear laminate that is formed to the exact size of a substrate on which the laminate is to be used, and which web has reduced strength lines transversely of the web at the exact or very slightly shorter length dimension of the substrate on which it is to be applied.

Plastic cards used for identification cards are personalized with text and images using resin and dye diffusion thermal transfer (D2T2) ribbons. Unless protected with another resin layer or film laminate, the dye (and thus the image printed) can rapidly degrade from abrasion, chemical attack from plasticizers such as those found in vinyl wallet windows, and from ultraviolet radiation (UV), for example.

Thermal transfer resin layers typically used in the plastic card industry consist of thin acrylic coatings. These provide some protection to the card surface and printed information, however, but longer term durability is a problem, as none of these thermal transfer materials is durable enough to satisfy customers. A second problem is that dye migration may still occur since the thermal film is made of porous material which cannot protect the dye from plasticizers and the like.

A third problem is in the application of the material as it tends not to stay on the card when laminated, especially along the edges of the card, and it flakes when laminated causing debris problems in the printer.

In order to improve on these thin thermal transfer layers, thicker laminates consisting of polyester film (PET) coated with a thermal transfer adhesive have been developed. In one type of laminate system, these laminate "chips" or "patches" are placed adhesive-side up on a pressure sensitive adhesive (PSA) coated carrier film of PET. During lamination to the card in the printer, the patch is transferred to the surface of the card. These types of patches typically cover only about 90% of the card surface. Dye migration, UV fading and abrasion can still occur on the edges of the card. Laminate patches can also be cut from a supply roll of PET film laminate and applied to cards in the printer, however, these rectangular patches also only cover about 90% of the card.

The use of individual laminate patches carried on a backing film for lamination onto a substrate is shown in U.S. Pat. Nos. 5,807,461 and 4,617,080. Also, the application of an overlay film on a printed paper is disclosed in U.S. Pat. Nos. 4,522,881; 4,599,259; and 4,977,136. The use of a continuous web with weakened transverse lines for separation sections is not shown.

SUMMARY OF THE INVENTION

The present invention relates to providing a transparent laminate material and scoring transverse lines on the web to form individual sections of a size that fits edge to edge on the length and width of a substrate. The transverse lines are weakened to have a tear strength in the range of two pounds tensile pull for standard two inch widths. This strength is obtainable for commonly used laminate thickness of 1.0 to 1.5 mils. The tear strength is selected to permit separating out the individual sections for laminating them to a substrate, a range of tear strength from about 0.75 pounds per inch of width to about 1.25 pounds per inch with the three pound maximum will work. The sizes can be controlled to within a few thousandths of an inch so the laminate sections which are nominally full size or very close to full size of the substrate, can be laminated on discrete or individual substrates without waste and using automated equipment. Virtually the entire card surface will be covered. Present automated equipment requires no more than 3 lb. tensile pull for severing individual sections.

The full size lamination section or patch protects the substrate, such as an identification card so the full surface of the substrate can be used for printing or otherwise recording information.

BRIEF DESCRIPTION OF THE DRAWINGS

FIG. 1 is a plan view of a section of a web of laminate having individual sections formed to conform to a substrate comprising an identification card;

FIG. 2 is a schematic representation of one form of separating individual sections on the web;

FIG. 3 is a modified method of separating individual sections on the web;

FIG. 4 is a plan view of a substrate having a lamination section laminated thereon;

FIG. 5 is a side view of FIG. 4; and

DETAILED DESCRIPTION OF THE ILLUSTRATIVE EMBODIMENTS

Figure 6:
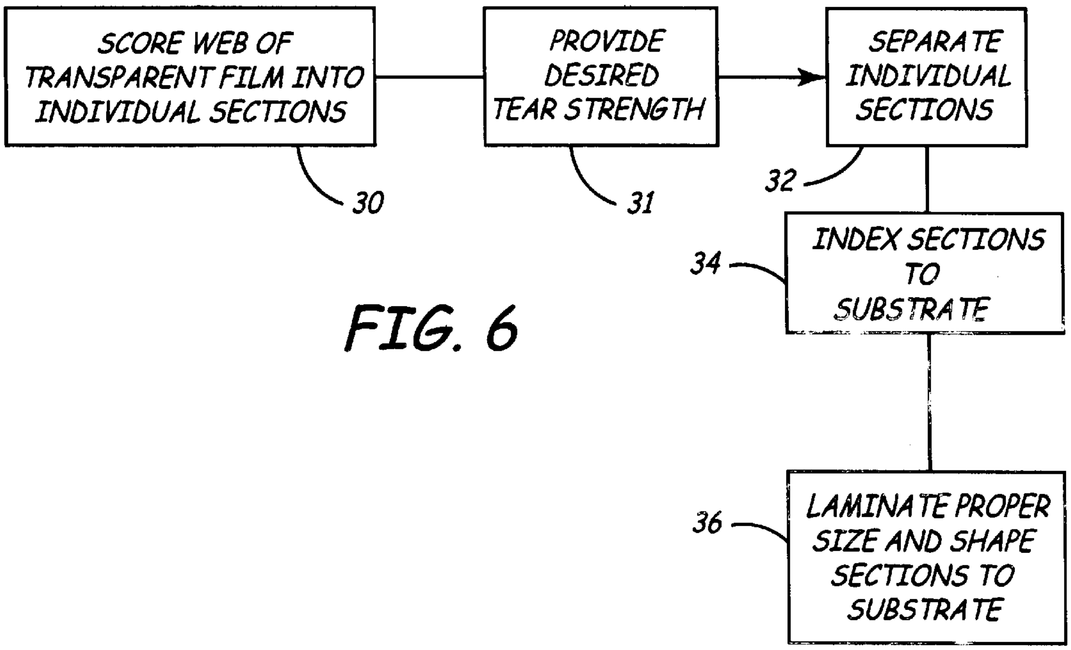
FIG. 6 is a block diagram representing the steps of utilization of the individual sections of a web shown in FIG. 1.

Referring to FIG. 1, a supply spool indicated generally at 12 is used to provide a continuous web 13 of a transparent material that can be laminated onto a suitable discrete or individual substrate, such as that shown at 15 (FIG. 5). The material preferably is a polyester film with a thermal transfer adhesive on one surface. The continuous web 13 is divided into individual sections 16, which are of size to fit the substrate 15, which is shown as an identification card. Individual sections 16 are formed by score lines or lines of weakened material indicated generally at 18 that extend transversely of the web. In addition, the corners 20 of the individual sections are rounded to conform to the shape of the substrate 15. The web is fed to a suitable machine, for separation along the weakened lines 18, and then handled in a manner that will index it to the individual substrate 15 and apply it as a laminate edge-to-edge, end-to-end, and around the corner configurations of the substrates. The sections 16 have a thermal transfer adhesive layer 17 on one surface, for adhering the laminate section to the substrate 15.

The rounded corners that are formed to fit the card corners, and the transverse weakened lines that delineate the individual laminate sections can be made by laser cutting. The transverse weakened lines are either formed by reducing the thickness of material when the web is made, by perforating the web material, or by die cutting slits across the web material. The smooth edges needed can be obtained by all three forms, but die cutting or laser cutting, which both permit cutting the rounded corners at the same time as the transverse weakened lines are exemplary.

FIG. 2 illustrates a weakened line 18A that is microperforations that can be made by various methods, such as an exemplary form using die cuts. The perforations are very small, so that the edge is essentially continuous, clean and straight when it is separated off from the web.

FIG. 2 shows a modified form that can be used by die cut where there is a cut shown at 18B between individual sections 16 that is of reduced thickness, so that there is a weakened transverse line across the web that can permit the individual sections to be severed, for example by holding one of the sections (usually at the supply roll end) and snapping the other one with a clamp member.

The lines of weakened material are designed to have a break strength that will permit snapping the sections from the web easily. A break strength of about two-thirds of the holding force applied to the end section will work. For example, a break strength of 2 pounds for a two inch wide web has been found satisfactory for existing equipment. A maximum break strength is about 3 pounds for a two-inch wide web since the weakened line has to break at tension loads well below the web break strength. Also the breaking is done with automated equipment that apply the tension loads, and the equipment has maximum load limits for reliable breaking. The weakened lines also have to be strong enough to withstand the tension when the roll is unwound and pulled to a position where it can be broken. Thus, the web weakened line should preferably have a separation strength of not less than 0.75 pounds per inch of width, but have a maximum break strength less than a preferred 1 pound per inch of width. The severed or broken edges are smoother with lower break strengths.

Various other ways of forming the transverse reduced strength or weakened line can be used. It is essential, however, that the edge of the laminate is not frayed or irregular, but is very smooth so that when it is laminated to a substrate 15, such as an identification card, it can come out all to within 0.10 mils from the edge to completely cover virtually all of the information on the card.

The edges must appear smooth to the eye or people will tend to try to lift the edges. Also the edges must feel smooth to the touch or again the natural tendency is to rub the edge of the card and to try to lift the laminate. Additionally, the rounded corners 20 can be cut in a suitable manner such as with dye cutting, water jet, or with laser cutting. This type of laminate, that goes edge-to-edge and end-to-end on the substrate 15 can include holographic images or optical variable devices and can cover films (either clear or with DVDs or holographs) as well as regular printed materials.

FIG. 6 is a flow diagram indicating the use of the transparent individual sections 16. The first step indicated at block 30 is to weaken the continuous web along transverse lines (called score lines) and cut the corners to size. The web of transparent material is thus divided into individual laminate sections, and is rewound onto a supply roll.

The weakened lines will be formed to provide the desired tear or break strength, as shown at block 31.

Then as shown at block 32 the individual laminate sections are separated for individually laminating the sections onto a card. This can be done by any desired mechanism, but generally it would be by applying a holding force to the web, usually on the next to the end section on the web, and then applying a pulling force (tension) to the end section and moving that to a location. Reference is made to application Ser. No. 09/430,566 for WASTELESS LAMINATOR identified above.

Block 32 represents separating the individual laminate sections of a selected size from the web, and then block 34 is for indexing the sections to be in registry with a substrate or card. At block 36 laminating the individual transparent laminate section in the proper position on the substrate completes the lamination process. The laminate section of transparent material can be a few thousands of an inch (say 0.010 inch) smaller than the substrate, so the edges of the laminate do not snag in use.

It has been found that clear 1.3 mil polyester material makes a good laminating material. Material sold under the mark TRANSGUARD by Transilwrap Company of Franklin Park, Ill. is satisfactory. The original continuous web is processed to separate the individual sections by the transverse lines of reduced strength, formed by laser cutting or die cut perforation. Holographic laminate material also can be used. Such material is made by Crown Roll Leaf and Holipak Industries, both of New Jersey. Also, for reverse image printing a vinyl chloride-vinyl acetate coated film can be used. The corners can be cut with laser cuts, to make them perfectly smooth, and the transverse line of reduced strength can be made so that the desired tension load will cause the individual sections to separate. The approximately two pounds of tension for separating sections of a two-inch wide web mentioned above has been found to be satisfactory, since the force that is available for separating the sections and driving the web with existing equipment is limited to approximately 3 lbs.

The laminate material for forming the laminate sections does not have to be clear, but can be opaque for some uses. The section can be formed to a precise size and laminated on top of each other to form a multi-layer card, such as the 3M Secure® Card. The section can be separated and fed with automated equipment after severing them from the web for lamination of a plurality of layers to form such a card. Each laminate section is applied to an underlying layer. That is essentially a substrate.

Although the present invention has been described with reference to preferred embodiments, workers skilled in the art will recognize that changes may be made in form and detail without departing from the spirit and scope of the invention.

What is claimed is:

1. A laminate web for application by a laminator to discrete identification card substrates, the laminate web comprising a plurality of individual laminate sections formed of a single layer of laminate material, each laminate section having at least one end that is linked to another laminate section at a transverse line of reduced strength, a size and shape that substantially conforms to a surface of the card substrate to which it is to be laminated, and a layer of thermal transfer adhesive.

2. The laminate web of claim 1, wherein the laminate material is a polyester film.

3. The laminate web of claim 1, wherein the laminate material is transparent.

4. The laminate web of claim 1, wherein each individual laminate section has dimensions that are within 0.010 inches of the dimensions of the surface of the card substrate to which the laminate section is to be laminated.

5. The laminate web of claim 1, wherein the transverse lines of reduced strength are perforations in the laminate material that allow the individual laminate sections to be separated through application of a separation load.

6. The laminate web of claim 5, wherein the separation load is a tensile load of not less than 0.75 lb. per inch of width.

7. The laminate web of claim 5, wherein the laminate material has a thickness between 1.6 and 1.5 mils, and the separation load is less than a maximum of 3 lbs. of tensile loading per inch of width.

8. The laminate web of claim 1, wherein the laminate material is a holographic material.

9. The laminate web of claim 1, wherein the laminate material is selected from a group consisting of a polyester film, a vinyl chloride-vinylacitate coated film, and a holographic film.

10. The laminate web of claim 1, wherein the laminate material forming each laminate section is a continuous sheet having cut edges only at sides and opposing ends of the laminate section.

* * * * *

UNITED STATES PATENT AND TRADEMARK OFFICE

CERTIFICATE OF CORRECTION

PATENT NO. : 6,737,139 B2
DATED : May 18, 2004
INVENTOR(S) : LuAnn N. Sidney et al.

It is certified that error appears in the above-identified patent and that said Letters Patent is hereby corrected as shown below:

Column 4,
Line 67, delete "1.6" and insert -- 1.0 --.

Signed and Sealed this

Twenty-fourth Day of August, 2004

JON W. DUDAS
*Director of the United States Patent and Trademark Office*